G. A. JOHNSON.
FISHING REEL.
APPLICATION FILED OCT. 26, 1914.
1,168,307.
Patented Jan. 18, 1916.
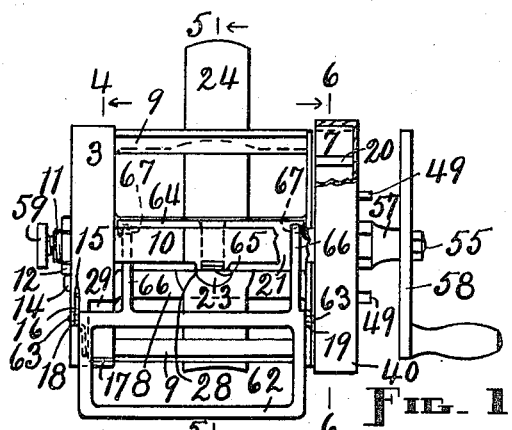
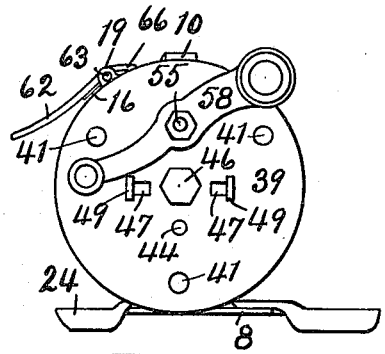
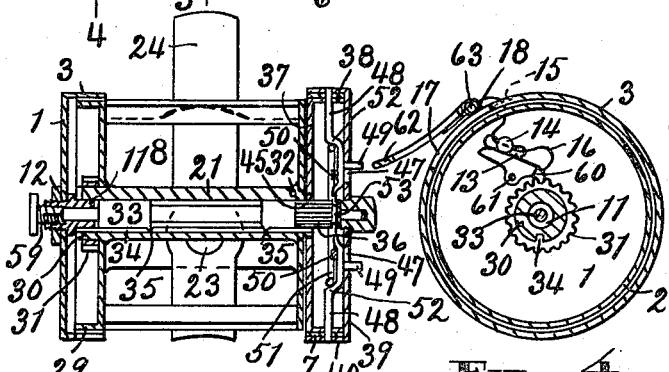
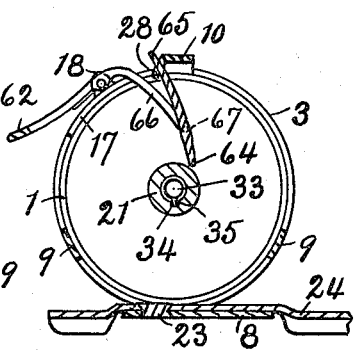
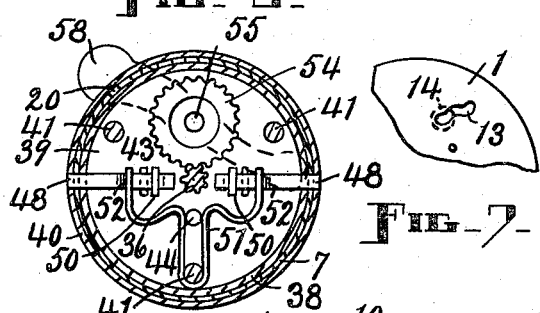
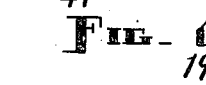
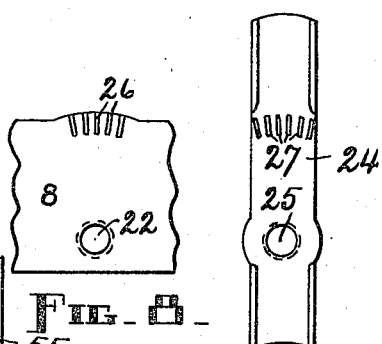
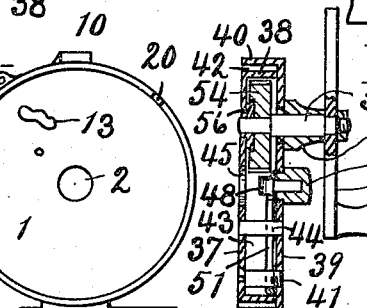
WITNESSES:
INVENTOR.
Gustaf A. Johnson,
BY Webster & Co.
ATTORNEYS.

UNITED STATES PATENT OFFICE.

GUSTAF A. JOHNSON, OF SPRINGFIELD, MASSACHUSETTS.

FISHING-REEL.

1,168,307.  Specification of Letters Patent.  Patented Jan. 18, 1916.

Application filed October 26, 1914. Serial No. 868,557.

*To all whom it may concern:*

Be it known that I, GUSTAF A. JOHNSON, a subject of the King of Sweden, residing at Springfield, in the county of Hampden and State of Massachusetts, have invented a new and useful Fishing-Reel, of which the following is a specification.

My invention relates to improvements in reels designed to be attached to fish-rods, and consists in general of a housing equipped with a line drag, adjustable means to support said housing on a rod, a spool and axial and driving members therefor, a spool drag or brake and a spindle drag or brake, and a detachable end for said housing, all of peculiar construction and as hereinafter set forth.

The objects of my invention are, first, to produce a strong but light in weight, durable, convenient, and readily controlled fishing reel, that is capable of use for casting purposes, fly fishing, or still fishing, such reel being adjustable on the rod upon which it is mounted, and being provided with two retarding or brake elements for the spool; second, to provide means in such a reel to prevent the line wound on the spool from tangling, either when the cast is being made or at any other time; third, to so construct the reel that the separable parts can be easily and quickly disunited, for cleaning or other purposes, and as easily and quickly reassembled, these operations being effected with little or no liability of soiling the fingers with the lubricant employed for the bearing members, and, fourth, to produce a reel that requires very little attention on the part of the fisherman, either when actually fishing or in order to maintain said reel in good condition for fishing.

Other objects and advantages will appear in the course of the following description.

I attain the objects and secure the advantages of my invention by the means illustrated in the accompanying drawings, in which—

Figure 1 is a top plan of a reel that embodies a practical form of my invention, end cap being broken away to show the slot in the ring at the right-hand end of the housing; Fig. 2, a right-hand end elevation of said reel; Fig. 3, a central horizontal section through the reel; Fig. 4, a vertical section taken on lines 4—4, looking in the direction of the associated arrow, in Fig. 1; Fig. 5, a vertical section on lines 5—5, looking in the direction of the associated arrow, Fig. 1; Fig. 6, a vertical section on lines 6—6, looking in the direction of the associated arrow, Fig. 1; Fig. 7, a fragmentary elevation of the left-hand end of said housing, showing the slot therein for the click-drag adjusting slide; Fig. 8, a fragmentary top plan of the housing base; Fig. 9, a bottom plan of the base plate; Fig. 10, a right-hand or open end elevation of said housing, and, Fig. 11, a transverse central vertical section through the aforesaid end cap.

Similar numerals designate similar parts throughout the several views.

Although I have shown and will describe a preferred form of construction, it is to be understood that various changes in the shape, size, arrangement and construction of some or all of the parts of the reel may be made without departing from the spirit of my invention.

It is assumed, for the purposes of this description, that the front of the reel is the side at the bottom of each of Figs. 1 and 3.

The reel housing consists of a left-hand end disk 1, which has a central opening 2 therein and is provided with an inwardly directed flange 3, a right-hand ring or band 7, a base 8 between said flange and said band at the bottom, two connecting bars 9 also between said flange and said band but at points intermediate of the horizontal planes of said base and the longitudinal center of the housing, and a connecting bar 10, the latter being above the horizontal top plane of said flange and band, in the center, and having end pieces which are integral with or secured to said flange and band. A bushing 11 is inserted in the opening 2 and held in place by a nut 12. A slot 13 is formed in the upper part of the disk 1, forward of the vertical center thereof, such slot being irregular in shape to afford a stop intermediate of its ends for a sliding pin 14. A slot 15 is provided in the upper front quadrant of the flange 3, for a spring 16, and said quadrant is cut out on the inside to form a recess 17. Projecting from the aforesaid quadrant near the outer edge thereof is an ear 18, and a companion ear 19 is inset and then projected from the inner edge of the band 7. A slot 20 is cut through the upper rear quadrant of the band 7, and extends clear across the same. A spool is represented at 21, and the slot 20 is provided for the passage of the line, when said spool is removed through the band 7, so that said line need not be detached either from said spool or the pole. The base 8 has an opening 22 therein for a rivet 23 by means of which a base plate 24, which also has an opening 25 therein for said rivet, is secured to said base. The base 8 has serrations 26 at its rear end on top, and the plate 24 has serrations 27 on the bottom to engage said first-mentioned serrations. A perforated lug or guide 28 projects downward and forward from the center of the cross bar 10.

The base plate 24 is mounted on the base 8 and secured thereto by the rivet 23. Said plate projects at both ends beyond the base 8, and is designed with said base to be mounted on and fit a fish pole, and to be fastened thereto in the usual manner. These parts of the reel are held together quite firmly by the rivet 23 and the engaging serrations 27 and 26, but not so tightly that some little adjustment of the housing can not be effected by turning the latter on the plate 24 and about said rivet. The serrations hold the housing in position after the same has been adjusted. This adjustment is required to adapt the reel to different poles, some of which may be perfectly straight while others are crooked.

The spool 21 is of ordinary construction, except that it has a flange 29 which is received within the housing flange 3 and rotates past the recess 17, thus serving as a brake band for the thumb when the cast is being made, and said spool also has a hub 30, within said brake band, upon which is securely mounted a toothed wheel 31, of the click brake. There is an opening 32 in the axial member of the spool through which the line is passed and knotted or otherwise fastened to said member. A spindle 33 is provided for the spool 21, and the latter has a keyway 34 therethrough to receive two projections 35 on said spindle. By this means the spool is rotatably connected with the spindle 33. The spindle 33 has a pinion 36 formed thereon near the right-hand end thereof.

A cap is provided for the open end of the housing, which cap consists of an inner disk 37 having an outwardly directed flange 38, and an outer disk 39 having an inwardly directed flange 40, these members being securely fastened together by means of a plurality of screws 41. The flange 40 encircles the flange 38 and is spaced therefrom, thus leaving an annular space 42 for the reception of the band 7. A chamber 43 is formed within this end cap for the reception of certain members presently to be described. The screws 41 connect the disks 37 and 39, and a pin or post 44 is set in said disks above the bottom screw. There is a central opening 45 in the disk 37 to accommodate the spindle 33, and a bushing 46 is screwed into the center of the disk 39. The bushings 11 and 46 afford bearings for the ends of the spindle 33. Two horizontal slots 47 are made in the disk 39, one being located behind and the other in front of the bushing 46.

Two oppositely disposed horizontal latches 48 are arranged in the chamber 37, and such latches are provided with lugs 49—49 which extend through and operate in the slots 47, and have cross-heads to assist in retaining said latches against the inner face of the disk 39. As additional retaining and guiding means for the latches 48, two lugs 50 are provided on the inside of the disk 39. As clearly shown in Figs. 3 and 6, alining slots are made in the flanges 38 and 40 and the band 7 to receive the outer terminals of the latches 48, when the end cap is in place on the housing. Thus the latches lock the end cap to the housing. A double-armed spring 51, for the latches, rises from the bottom screw 41, and spreads at the terminals to engage offset parts of said latches, which parts form shoulders 52—52, and thus normally force said latches outwardly into locking engagement with the flanges 38 and 40 and the band 7. The outward movement of the latches is limited by the lugs 49 and the outer ends of the slots 47. The base of the spring 51 is between the aforesaid screw and the flange 38, and said spring is held in position by these parts and the post 44, which latter is located between the upright portions of said spring that rise directly from said screw. The inner ends of the latches 48 are designed, when said latches are forced inwardly against the resiliency of the spring 51, to engage the spindle 33 and lock the same to the end cap. To this end there is an annular groove 53 in the spindle 33, which groove is in line with the inner ends of the latches when the parts are in place.

A driving gear 54 is secured, in the chamber 43 above the pinion 36 and normally in engagement therewith, on a spindle 55, which is journaled in bushings 56 and 57, that are respectively carried by the disks 37 and 39—see Fig. 11. The outer end of the spindle 55, which latter is the driving spindle, is provided with a handle or crank 58. By means of the crank 58, the spindle 55 and the gear 54, the spindle 33 and the spool 21 may be driven in either direction, through the medium of the pinion 36 and the connections between said spindle 33 and said spool, assuming that said spindle 33 be in normal position.

When in normal position the spindle 33 has its bearing terminals in the bushings 11 and 46, as previously observed. When in this position a drag or brake of the friction type may be applied to the spindle 33 by means of a split tension screw 59, which is threaded into the outer end of the bushing 11, contacts with the end of said spindle that is in said bushing, and crowds said spindle to the right with a shouldered part of said spindle against the inner end of the bushing 46, as clearly shown in Fig. 3. The brake thus applied to the spindle 33, and consequently to the spool 21, may be increased or decreased in force by turning the screw 59 in or out accordingly.

The click brake previously mentioned comprises, in addition to the toothed wheel 31, a pawl 60 which is pivoted at 61 against the inside face of the disk 1 and normally engages said wheel. The spring 16 acts on the pawl 60 to force it into engaging relation with the toothed wheel 31. When the spool 21 is withdrawn, the wheel 31 which is mounted on the spool hub 30 is carried away from the pawl 60, but the slide 14 at that time prevents said pawl from being rocked by the spring 16 into the way of said wheel, upon the return of the latter with said spool, so that said wheel upon its return at once reëngages said pawl. As the toothed wheel 31 is rotated with the spool 21 the teeth of said wheel click past the engaging spring-pressed pawl 60, and a certain amount of drag or of braking force is thus applied to said spool. This click brake may be used either with or without the screw 59, and the latter may be used without the former, as desired.

The force exerted by the pawl 60 on the click wheel 31 is increased or decreased by moving the slide 14 backward or forward accordingly in the slot 13, since the spring 16 passes through said slide and the parts are so arranged that said spring is caused to exert more force on said pawl the farther back said slide is moved. Thus the force of the click brake on the spool is varied or regulated to meet different conditions, as is the case with the screw 59.

In order to avoid tangling the line on the spool and to retain proper control thereof, it is necessary to maintain a drag on said line at or adjacent to the point where the line leaves the spool or leaves that portion of the line which is wound thereon to pass to the first ring on the pole. In other words, the friction member for the line should always engage the same at the tangential point, hence must follow, as the winding on the spool increases and decreases, a radius or a radial plane that marks the varying tangents, otherwise a line drag is of little or no use. To this end I provide a lifter 62, which is pivotally mounted at 63—63 in the ears 18 and 19, and a drag bar 64, which is pivotally attached at its ends to said lifter, and has a central tongue 65 that rises therefrom and passes through and operates in the cross-bar lug 28. The front of the lifter 62 projects over in front of the housing, within convenient reach of the thumb, and is extended far enough to the left to afford room for the thumb, when said front of the lifter is pressed down to elevate the bar 64, to bear on the flange 24. The rear of the lifter consists of two downwardly and inwardly projecting arms 66 to the free ends of which the bar 64 is pivoted at 67—67. It will now be seen that the bar 64, when actuated by the lifter 62, follows a plane radial to the axis of the spool 21, instead of describing an arc of a circle, owing to the fact that the tongue 65 slides in the stationary lug 28. This radial plane is approximately that plane of the changing tangents of the line wound on the spool and extending therefrom to the adjacent ring on the pole. The bar is normally held down on the axial member of the spool 21 or on the line wound thereon by means of the spring 16, such spring being looped around the left-hand pivot 63 and extending forward from said pivot and to the right under the adjacent part of the lifter 62, thus acting to force said bar downward through the medium of said lifter. The spring 16 passes rearwardly, from the left-hand pivot 63, to the slot 15, and then downward through said slot into the space within the flange 3 and beyond the spool flange 29, wherein it passes through the inner part of the slide 14 and into engagement with the pawl 60. This single spring, therefore, serves for the line drag, the click brake, and the click-brake tension regulator.

The lifter 62 affords ready and convenient means for raising the drag bar 64 at any and all times, and while such bar is raised the operator can without difficulty apply his thumb to the flange 29, through the recess 17, the same thumb with which said lifter is operated to raise said bar.

To separate the parts for cleaning or any other purpose, raise the bar 64 entirely clear of the spool 21, through the medium of the lifter 62, grasp the lugs 49 and press them toward each other to actuate the latches 48, against the resiliency of the spring 51, out of engagement with the housing band 7 and into engagement with the spindle 33, and withdraw the end cap and its contents with said spindle from the housing. The spool 21 comes away with the spindle 33, the line passing through the slot 20 in the housing band 7. The toothed wheel 31 at this time slips out of engagement with the pawl 60, the hub 30, which is adapted to be mounted on the inner end of the bushing 11, slides off of said bushing, and the corresponding terminal of the spindle 33 slips out of said bushing. Upon the release of the lugs 49 and the latches 48, the spring 51 operates to throw said latches out of the groove 53, so that the spindle and the end housing can be separated. Upon the separation of these parts, the pinion 36 and the gear 54 slide out of engagement, as the right-hand terminal of the spindle 33 and the bushing 46 part company. The spool 21 can be removed from the spindle 33 at any time after the parts have been taken from the housing, and it is possible, of course, to withdraw said spindle from said spool in the first instance.

The manner of reassembling the parts will be readily understood from the foregoing, the operations and motions being practically the same as before, only certain of the directions of movement being reversed. In reassembling care must be exercised to so adjust the end cap on the band 7 that the latches 48, when released to their spring, will reënter the slots provided for them in said band.

Ample provision is made for properly oiling the running parts of this reel, yet the construction is such that there is little or no liability of getting the oil on the fingers or on the line, even while taking the reel apart and putting it together.

In Fig. 1 a portion of the cross bar 10 is broken away to show the parts below in full. The base 8 is dropped a little below the bottom of the flange 3 and the band 7, as is clear from Figs. 2, 5 and 10. The middle portion of the spindle 33 is cut out to lighten said spindle, and the projections 35 are formed by forcing outward from the ends of the cut-away portion parts of the stock that constitute such ends. The brake and drag elements prevent all backlash on the part of the spool. The base plate 24 has a raised center, as shown in Figs. 2 and 5, to receive beneath it the base 8.

What I claim as my invention, and desire to secure by Letters Patent, is—

1. The combination, in a fishing reel, with a housing consisting in part of a fixed base piece, and a spool rotatably mounted in said housing, of a base plate extending over said base piece and pivotally attached directly thereto, said base piece and said plate having engaging serrations, and the arrangement of parts being such that said housing is normally held stationary, but can be partially rotated upon the application of force thereto, for adjustment on the pivotal connection between said base piece and said base plate.

2. The combination, in a fishing reel, with a housing consisting of a disk provided with an inwardly-directed flange, at one end, a band at the other end, and connecting members between said flange and band, said disk, flange, band and connecting members being rigidly and fixedly attached one to another, and said band having an opening therein for the passage of a line, of a revoluble spool adapted to be inserted in said housing and removed therefrom through said band, the line from said spool, if attached at its outer end, entering and escaping from the housing by way of said passage, when and accordingly as said spool is inserted or removed.

3. The combination, in a fishing reel, of a housing having a flange with a thumb-receiving recess therein, a spool mounted to rotate in said housing, and having a projecting rim forming a thumb-controlled brake band within said housing flange, and a lifter mounted on said housing and having a part which is adjacent to said recess, and provided with a drag bar for said spool and the line thereon, the arrangement of parts being such that both said lifter and said brake band are under the control of the thumb of the operator.

4. The combination, in a fishing reel, with a housing having an annular part at one end, a removable chambered cap comprising two attached flanged members arranged with the flange of one within and spaced from the flange of the other, said annular part being receivable within the space between said flanges, and means to lock said cap to said annular part, of a spool adapted to be mounted to revolve in said housing.

5. The combination, in a fishing reel, with a housing having an annular part at one end, a removable chambered cap comprising two attached flanged members arranged with the flange of one within and spaced from the flange of the other, said annular part being receivable within the space between said flanges, and a latch in the chamber in said cap to lock said flanges to said annular part and release them therefrom, of a spool adapted to be mounted to revolve in said housing.

6. The combination, in a fishing reel, with a housing having an engaging part at one end, a cap having an engaging part for said first-mentioned part, and provided with a double-ended latch, and spindle bearings in said housing and cap, of a spindle adapted to be journaled in said bearings, and having an engaging part, said latch being adapted to lock and release said housing and cap engaging parts, and to lock and release said spindle bearing part, according to the position of said latch, and a spool adapted to be mounted on said spindle.

7. The combination, in a fishing reel, with a housing having an annular part at one end, a cap having flanges which form an annular space to receive said annular part of the housing, spring-pressed latches arranged in said cap to lock and release with their outer ends said flanges to and from said annular part, and spindle bearings in said housing and cap, of a spindle adapted to be journaled in said bearings, said spindle having an engaging part for the inner ends of said latches, when the latter are actuated inwardly, and a spool adapted to be mounted on said spindle.

8. The combination, in a fishing reel, with a housing having an annular part at one end, a slotted cap having flanges which form an annular space to receive said annular part of said housing, spring-pressed latches arranged in said cap to lock and release with their outer terminals said flanges to and from said annular part, and provided with lugs which extend through the slots in said cap, and spindle bearings carried by said housing and cap, of a spindle adapted to be journaled in said bearings, said spindle having an engaging part for the inner ends of said latches, when the latter are actuated inwardly, and a spool adapted to be mounted on said spindle.

9. The combination, in a fishing reel, with a housing having a slotted end, and a spring-pressed pawl pivotally attached to said end, of a spool mounted to rotate in said housing, a toothed wheel arranged to rotate with said spool in engaging relation to said pawl, and a slide in the slot in said housing end, said slide engaging the pawl spring to vary the tension thereof according to the position of said slide in said slot.

10. The combination, in a fishing reel, with a housing having a slotted end, a pawl pivotally attached to said end, and a suitably attached spring bearing on said pawl, of a spool mounted to rotate in said housing, a toothed wheel arranged to rotate with said spool and in engaging relation to said pawl, and a slide in the slot in said housing end, said slide engaging said spring to vary the tension thereof according to the position of said slide in said slot.

11. The combination, in a fishing reel, with a housing having a slotted end, a pawl pivotally attached to said end, a line-drag member pivotally mounted on said housing, and a suitably attached spring bearing at one end on said pawl and at the other end on said line-drag member, of a spool mounted to rotate in said housing, a toothed wheel arranged to rotate with said spool and in engaging relation to said pawl, and a slide in the slot in said housing end, said slide engaging said spring to vary the tension thereof on said pawl, according to the position of said slide in said slot.

12. The combination, in a fishing reel, with a housing, and a revoluble spool therein, of a pivotally mounted line drag, and means to cause the line-engaging part of said drag to move toward and away from the axis of said spool in an approximately straight radial course.

13. The combination, in a fishing reel, with a housing having a guide member for a tongue, and a revoluble spool in said housing, of a lifter pivotally mounted on said housing, and a drag bar, for said spool and the line thereon, pivotally attached to said lifter, said bar being provided with a tongue that operates in said guide member.

14. The combination, in a fishing reel, with a housing having a recessed flange at one end, and a spool rotatably mounted in said housing, and having a thumb-brake flange within said first-mentioned flange and revolving adjacent to the recess therein, of a line-drag member pivotally mounted on said housing, and extending into adjacency to said recess, whereby the thumb may be simultaneously applied to said member and said thumb-brake flange.

GUSTAF A. JOHNSON.

Witnesses:
F. A. Cutter,
A. C. Fairbanks.

Copies of this patent may be obtained for five cents each, by addressing the "Commissioner of Patents, Washington, D. C."